United States Patent Office
3,554,880
Patented Jan. 12, 1971

3,554,880
PROCESS FOR ELECTROPLATING POLYOXYMETHYLENE RESINS

William C. Jenkin, Kettering, Ohio, assignor to E. I. du Pont de Nemours and Company, Wilmington, Del., a corporation of Delaware
No Drawing. Filed Jan. 11, 1968, Ser. No. 697,031
Int. Cl. B44c *1/22;* B44d *1/092;* C23b *5/60*
U.S. Cl. 204—30 2 Claims

ABSTRACT OF THE DISCLOSURE

A process for preparing polyoxymethylene homopolymer for electroplating by acid etching, e.g. in orthophosphoric acid, followed by basic treatment, e.g. 10% sodium hydroxide.

This invention relates to a process for the electroplating of polyoxymethylene homopolymers.

Various processes are known in the art for electroplating of non-conductive plastics. The processes generally require some sort of surface preparation, followed by deposition of a nucleant, e.g. application of a sensitizer solution and an activator solution, and the application of an electroless plating of copper or nickel, finally followed by the electrodeposition of one or more layers of metal. Such a method is specifically shown by Modern Plastics Encyclopedia, 1967 at pp. 1019–1021.

The present invention is concerned with surface preparation of polyoxymethylene homopolymers, so that they can be efficiently plated by this technique.

The polyoxymethylene homopolymers to which this invention is applicable are generally those esterified homopolymers that are free from lubricant. (Lubricants, such as "Acrawax," are often added to polyoxymethylene to enhance mold release.)

In addition, the homopolymer must be stabilized thermally and oxidatively. The prior art discloses various thermal and oxidative stabilizers in polyoxymethylene. The homopolymer will be sufficiently oxidatively and thermally stabilized if it contains at least one member from each of the following classes of compositions in concentrations of 0.1% to 5% based upon the weight of the polymer.

Class A.—Substituted hydrazines, hydrazides, substituted ureas and thioureas, polyamides hydrolyzable to mixtures of dicarboxylic acids and diamines and to omega-amino-carboxylic acids, and aromatic aminosulfones. Particularly useful members of this class include:

tetraphenylhydrazine
acetyl-phenyl-hydrazine
adipic dihydrazide
n-butylurea
cyanomethylurea
ethyleneurea
phenylthiourea
bis-(2-methyl-3-chlorophenyl)-thiourea
polyamides of N-methoxymethylhexamethylenediamine and adipic acid
polyamides of 1,1,6,6-tetramethylhexamethylenediamine and adipic acid
polyamides of 2,11-diaminododecane and 2,2,5,5-tetramethyladipic acid polyamides of caprolactam, hexamethylenediamine, adipic acid and sebacic acid
polyamides of 2,5-dimethylpiperazine and glutanic acid
polyamides of bis(3-aminopropyl) ether and adipic acid
p-aminophenyl sulfone
4,4′-diamino-3-methoxydiphenyl sulfone
4,4′-diamino-2-acetyldiphenyl sulfone
2,4,4′-triaminodiphenyl sulfone.

Class B.—Substituted phenols having a pK of more than 6.0, bisphenolic compounds and secondary and tertiary aromatic amines. Particularly useful members of this class include:

di-beta-naphthol
n-butyl-p-aminophenol
2,2′-methylene-bis(4-ethyl-6-t-butylphenol)
2,2′-methylene-bis(2-t-butyl-5-methylphenol)
2,2′-ethylidene-bis(4-methyl-6-t-butylphenol)
2,2′-butylidene-bis(4-methyl-6-t-butylphenol)
2,2′-butylidene-bis(4-t-butyl-6-methylphenol)
diphenylamine
di-beta-naphthyl-p-phenylenediamine
p-hydroxyphenylmorpholine
di-sec-butyl-p-phenylenediamine
N,N′-diphenyl-p-phenylenediamine
di-beta-naphthylbenzidine.

It has been found that if such polyoxymethylene compositions are etched with an acid solution, followed by treatment with a basic solution, the surface may be then sensitized and satisfactorily plated.

This acid etching process is preferably merely an immersion process. However, it is possible to spray the acid etching solution against the resin or to apply the acid as a vapor. The etching time will depend to some extent upon the particular etching procedure employed and to some extent upon the etching agent and its concentration.

Suitable acid etching agents include ammonium hydrogen sulfate, p-toluene sulfonic acid, sulfuric acid and orthophosphoric acid. Orthophosphoric acid is the prefered agent, and it is preferably used at concentrations of about 85% by weight. Using this concentration a satisfactory etch can be obtained on polyoxymethylene homopolymer compositions, in 1 to 3 minutes at 50 to 70° C.; lower temperatures require longer etching times.

It is preferable, to avoid contamination of the basic solution, to water rinse the acid etched resin prior to treating it with the basic solution. Tap water is satisfactory.

The acid etched resin is now treated with a basic solution. Again the most satisfactory method of treatment is to immerse the resin in the solution, although it is possible to treat the surface by spraying the surface with the basic solution. The length of time required to give a satisfactory basic treatment depends upon the basic compound used and upon its concentration. In general it is desirable to carry out the treatment in the shortest possible time.

Suitable basic solutions include ethylenediamine 5% by weight solution in water at about 38° C., preferably about 60° F., and about 10% by weight sodium hydroxide solutions at boiling, i.e., about 104° C. The ethylenediamine solution requires about 5 minutes to satisfactorily treat the surface when agitated with ultrasonic agitation, and about 30 minutes when no such agitation is used.

The sodium hydroxide will satisfactorily treat the surface in about 3 to 8 minutes.

After the sodium hydroxide treatment, the polyoxymethylene resin is now ready for plating according to the conventional sequence, i.e. sensitizing, activating, electroless plating, and electroplating. As in the usual plating sequence, the baths are selected so as to not unnecessarily attack the earlier applied layers, or diffusing through the earlier applied layers and attacking the underlying resin.

In the following examples which illustrate the invention, all parts and percentages are in parts by weight unless otherwise specified.

EXAMPLE I

Commercially available polyoxymethylene homopolymer esterified resin containing oxidative and thermal stabilizers having a number average molecular weight of about 40,000, was molded into a plaque 3" x 5" x ⅛". No lubricant was in the resin, and no mold release agent was used on the mold. The plaque was then immersed at about 60° C. for 2 minutes in 85% orthophosphoric acid. The plaque was then rinsed for two minutes in running tap water, and then immersed for about 5 minutes in 10% by weight boiling sodium hydroxide. The plaque was then rinsed with tap water for 2 minutes. The plaque was then immersed for ½ minute in an acid solution of stannous chloride containing about 1 to 3 oz. per gal. of stannous chloride and 4 to 20% by volume hydrochloric acid. The plaque was again thoroughly rinsed (this time in distilled water) and now immersed for ½ minute in an acidic palladium chloride, $PdCl_2$, solution, pH about 4.4, containing about 0.25 to 0.5 g./liter paladium chloride and about 5 g./liter of sodium acetate. The plaque was rinsed for ½ minute with demineralized water, and then immersed at room temperature for five minutes in a commercially available electroless copper bath. A typical bath contains about 5 g./liter $CuSo_4 \cdot 5H_2O$, 7 g./liter NaOH, 10 g./liter of 37–41 weight per volume Formalin and 25 g./liter of Rochelle salts. The plaque was again rinsed and then dipped in a 1% solution of $H_2SO_4$ for 6 seconds to remove any oxide, again rinsed and then electroplated with a semi-bright nickel strike at a current density of 30 amps. per sq. ft. for 2 minutes from a Watts type bath containing $NiSO_4$ 45 oz./gal., $NiCl_2$ 7 oz./gal., boric acid 6 oz./gal. and various brighteners, leveling agents, and antipitting agents. The pH was about 4 and the temperature 55° C.

The resulting electroplated coating adhered tightly to the substrate.

EXAMPLE II

The procedure of Example I was followed except that instead of orthophosphoric acid, sulfuric acid vapors at 105° C. were used to etch the polyoxymethylene plaque, and the plaque was given a basic etch with 5% ethylenediamine a 60° C. using ultrasonic agitation for 15 minutes. The resulting electroplated coating adhered tightly to the substrate.

What is claimed is:

1. In a process for electroplating thermally and oxidatively stabilized polyoxymethylene homopolymer which comprises the steps of surface preparation of the resin, nucleant deposition, electroless plating and electroplating; the improvement in surface preparation which comprises etching for 1 to 3 minutes at 50 to 70° C. the polyoxymethylene resin with orthophosphoric acid having a concentration of about 85% by weight followed by treating for 3 to 8 minutes at about 104° C. the surface of the polyoxymethylene resin with sodium hydroxide having a concentration of about 10% by weight.

2. The process of claim 1 in which the step of nucleant deposition includes the step of applying a sensitizer before an activator.

References Cited

UNITED STATES PATENTS

| | | | |
|---|---|---|---|
| 2,666,693 | 1/1954 | Meretey | 156—2 |
| 2,801,447 | 8/1957 | Wolinski | 117—47 |
| 2,805,173 | 9/1957 | Ambler | 117—62 |
| 3,035,916 | 5/1962 | Heiart | 156—2X |
| 3,142,582 | 7/1964 | Koretzky et al. | 117—47 |
| 3,235,426 | 2/1966 | Bruner | 156—2 |
| 3,315,285 | 4/1967 | Farmer | 117—47X |
| 3,361,589 | 1/1968 | Lindsey | 117—118 |

FOREIGN PATENTS 1,000,519 8/1965 Great Britain.

JOHN H. MACK, Primary Examiner

T. TUFARIELLO, Assistant Examiner

U.S. Cl. X.R.

117—47.5; 134—27, 28; 156—2